Oct. 27, 1931.  F. B. CALDWELL  1,829,392

FLEXIBLE BEARING FOR SCREW CONVEYERS

Filed Sept. 7, 1926  2 Sheets-Sheet 1

Inventor
Frank B. Caldwell
by Parks & Carts
Attorneys.

Oct. 27, 1931.  F. B. CALDWELL  1,829,392
FLEXIBLE BEARING FOR SCREW CONVEYERS
Filed Sept. 7, 1926   2 Sheets-Sheet 2

Inventor
Frank B. Caldwell
by Parker & Carter
Attorneys

Patented Oct. 27, 1931

1,829,392

UNITED STATES PATENT OFFICE

FRANK B. CALDWELL, OF OAK PARK, ILLINOIS, ASSIGNOR TO LINK-BELT COMPANY, OF CHICAGO, ILLINOIS, A CORPORATION OF ILLINOIS

FLEXIBLE BEARING FOR SCREW CONVEYERS

Application filed September 7, 1926. Serial No. 133,792.

My invention relates to improvements in flexible bearings for screw conveyers. It has for one object to provide a new and improved type of flexible bearing wherein and whereby bearings may be interposed between successive screw conveyer flights, and by the use of which the successive flights may be coupled together and properly supported independent of slight misalignment of the parts. Another object is to provide a new and improved type of flexible member which may be used as a part of a flexible shaft. Other objects will appear from time to time throughout the specification and claims.

My invention is illustrated more or less diagrammatically in the accompanying drawings, wherein.

Like parts are indicated by like characters throughout the specification.

A is a conveyer trough. Associated with it is a bearing bracket $A^1$. Arranged longitudinally of this trough are a series of hollow shafts $A^2$ carrying conveyer flights sections $A^3$ thereon, there being a conveyer flight between each adjacent pair of bearing brackets. $A^4$ is a spherical bearing on the bearing bracket. Projecting out from the end of each hollow shaft $A^2$ is a stub shaft $A^5$ preferably bolted in place as at $A^6$ in the hollow shaft.

Extending transversely of the end of each stub shaft is a cylindrical lug B joined to the end of the shaft by a tapered neck $B^1$. Mounted for rotation within the bearing $A^4$ is a bearing ball $B^2$. This bearing ball is flattened on its opposite sides and has a spherical bearing surface $B^3$ to engage the bearing $A^4$. Extending across the flattened sides of the ball $B^2$ at right angles to each other in parallel planes are segmental cylindrical pockets $B^4$, $B^5$, the shape of these pockets being such that the cylindrical lugs B on the opposed stub shafts fit snugly in the pockets, though free to rock. These pockets are each rounded at one end about the body of the ball as at $B^6$ and are open at the other end through the face of the ball and closed by a removable block $B^7$. This block $B^7$ is flanged at $B^8$ to engage slots $B^9$ in the ball so that the block may be slid into the face of the ball, closing the pocket $B^4$ and holding the cylindrical lug B against lateral displacement. These members $B^7$ are held in place in the ball by holding screws $B^{10}$ which pass through the ball in the opposed sides and are screwed into the blocks $B^7$ to hold them against withdrawal.

These blocks $B^7$ and the holding screws are assembled after the two stub end shafts are put in place and the ball is finished and ground after they are assembled with the stub end shafts locked in place, thus providing a smooth continuous bearing surface on the outside of the ball. This is a satisfactory arrangement because when anything goes wrong with either one of the stub shafts or the ball, the whole assembly is taken out and replaced by a new one.

The fact that each stub end shaft is free to oscillate about the axis of its cylindrical lug with respect to the ball results in a flexible arrangement giving a universal joint action, since the ball itself is free to oscillate in its bearing, and thus misalignment of the shaft flights does not result in binding of the bearings or undue wear.

Obviously if a series of balls with alternating stub shafts are used, a flexible shaft is provided, there being free play between the separate sections of the shaft.

Figure 1:
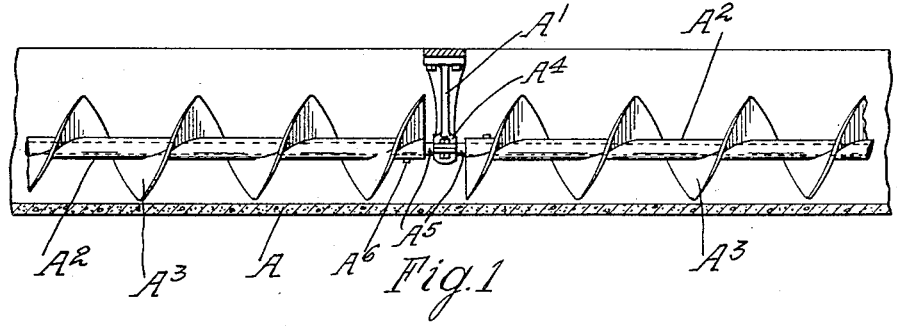
Figure 1 is a side elevation with parts in section.
Figure 2:
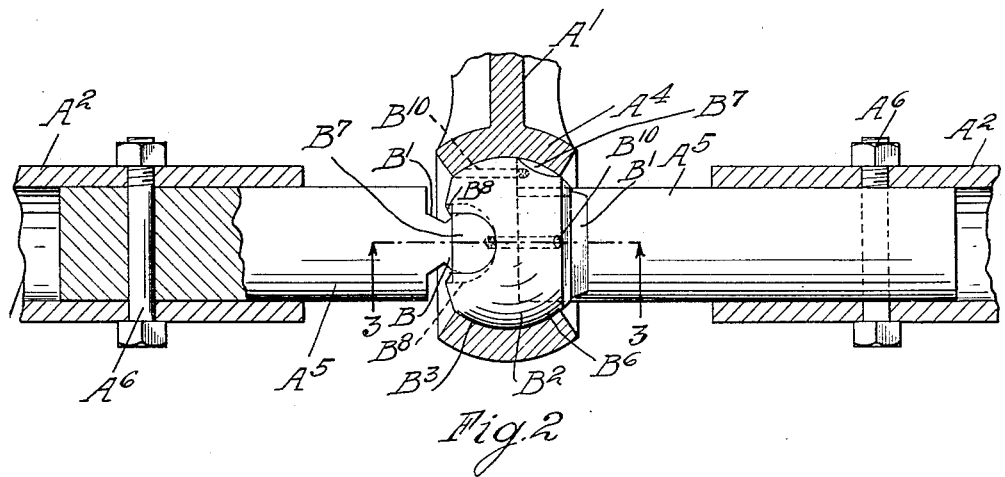
Figure 2 is a detail section.
Figure 3:
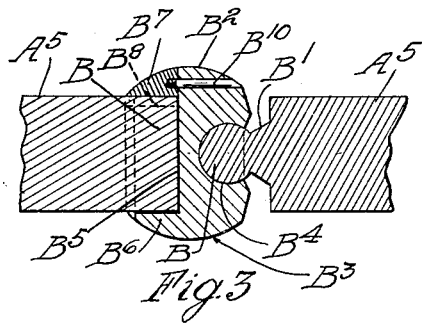
Figure 3 is a section along the line 3—3 of Figure 2.
Figure 4:
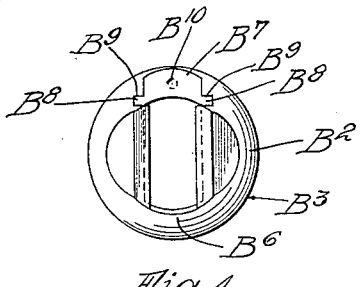
Figure 4 is a side elevation of a bearing ball.
Figure 5:
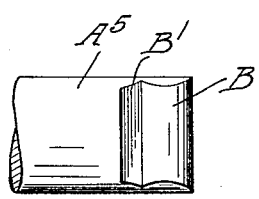
Figure 5 is a side elevation of a stub shaft adapted to be associated with the bearing ball.
Figure 6:
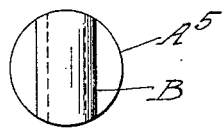
Figure 6 is an end view of the shaft shown in Figure 5.
Figure 7:
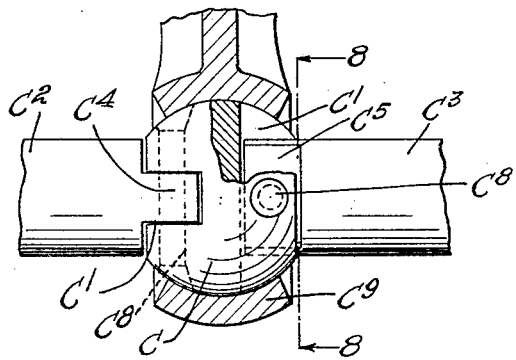
Figure 7 is a detail, part section in part elevation of a modified form.
Figure 8:
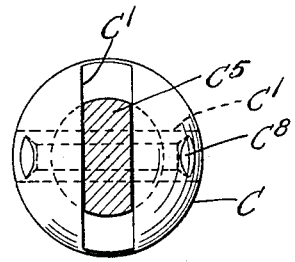
Figure 8 is a section along the line 8—8 of Figure 7.
Figure 9:
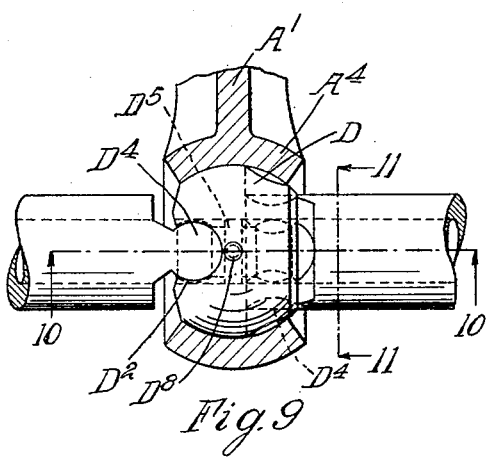
Figure 9 is a detail part section part elevation of a further modified form.
Figure 10:
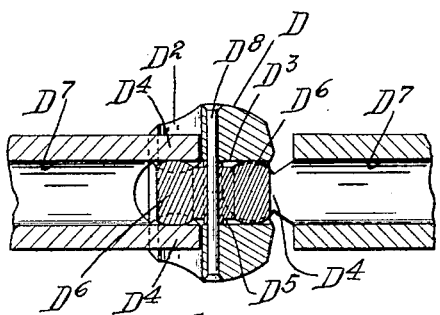
Figure 10 is a section along the line 10—10 of Fig. 9.
Figure 11:
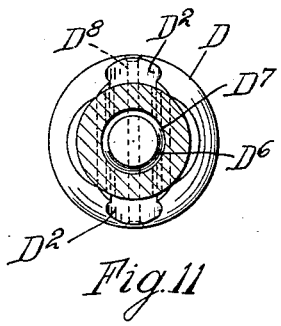
Figure 11 is a section along the line 11—11 of Fig. 9.
Figure 12:
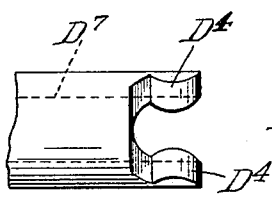
Figure 12 is a detail of the stub shaft.
Figure 13:
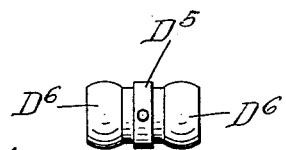
Figure 13 is a detail of the holding ball.

In the modified form shown in Figures 7 and 8 the ball C is slotted with rectangular slots $C^1$ in its opposed flattened face, these slots being at right angles. The stub end shafts $C^2$ $C^3$ have rectangular lugs $C^4$ $C^5$ thereon to engage the slots $C^1$, and are held in place by the pins $C^8$ which extend through the body of the ball and through the lugs permitting angular movement of the lugs $C^4$ $C^5$ with respect to the ball, the ball being free to rotate or oscillate in the concave bearing $C^9$ so as to give a flexible support for the conveyer flights.

In the modified form shown in Figures 9 to 13 the ball D has on its opposed flattened faces, arranged at right angles one to the other, cylindrical pockets $D^2$. The ball in this case is centrally bored out as at $D^3$. Each stub end shaft has a plurality of lugs $D^4$ $D^4$ generally circular in cross section adapted to penetrate the pockets $D^2$. The holding head $D^5$ having at either end a ball $D^6$ is slid in through the central aperture $D^7$ in the stub end shaft after the two stub end shafts are placed until it assumes the position shown in Figure 10. Then the pin $D^8$ is passed through the ball and the head $D^5$, holding it in place in the ball. The ball $D^6$ engages the inner sides of the lugs $D^4$ preventing lateral displacement of the lugs and stub shaft with respect to the ball D.

Although I have shown an operative device, still it will be obvious that many changes might be made in size, shape and arrangement of parts without departing materially from the spirit of my invention, and I wish, therefore, that my showing be taken as in a sense diagrammatic.

It is obvious that while this flexible bearing is primarily intended for and it is designed for use in connection with screw conveyer flights, nevertheless such a device is equally well adapted where a flexible bearing is desirable. For instance, it might be used as a bearing for idler rolls for a belt conveyer or as part of a transmission shaft system or in any other arrangement where such a device could conveniently be made use of.

I claim:

1. A flexible bearing for conveyer flights and the like comprising a spherical bearing socket, a ball mounted for oscillation and rotation therein, two cylindrical sockets in the ball whose axes are at right angles to each other, and cylindrical bearing members in said sockets free to oscillate about the socket axes, the sockets being closed at each end to prevent lateral displacement of the cylindrical members, the closure at one end of each socket being removable.

2. A flexible bearing for conveyer flights and the like comprising a spherical bearing socket, a ball mounted for oscillation and rotation therein, two cylindrical sockets in the ball whose axes are at right angles to each other, and cylindrical bearing members in said sockets free to oscillate about the socket axes, the sockets being closed at each end to prevent lateral displacement of the cylindrical members, the closure at one end of each socket being removable, and comprising a block slidably mounted in the ball at right angles to the axis of the cylindrical socket, and means for permanently holding the block in place.

3. The combination with a spherical bearing socket of a ball mounted for oscillation and rotation therein, a cylindrical socket in the ball open along one side, and one end, a cylindrical bearing lug contained within the socket, supporting means for the lug projecting through the open side of the cylindrical socket, and means for closing the open end of the cylindrical socket.

4. The combination with a spherical bearing socket of a ball mounted for oscillation and rotation therein, a cylindrical socket in the ball open along one side and one end, a cylindrical bearing lug contained within the socket, supporting means for the lug projecting through the open side of the cylindrical socket, and means for closing the open end of the cylindrical socket, said means comprising a flanged block slidably mounted in the ball at right angles to the axis of the cylindrical socket, and means for holding the block in position in the ball.

5. The combination with a spiral conveyer flight having a central hollow shaft of a flexible bearing therefor comprising a fixed spherical socket, a ball mounted for rotation therein having two opposed relatively flat faces, cylindrical channels open along one side, one in each flat ball face and at right angles one to the other, stub end shafts mounted in the hollow conveyer shafts having cylindrical members at right angles to the axes of the shafts, located one in each cylindrical pocket, each said pockets being permanently closed at one end, and removable closures for the other ends of the sockets.

6. The combination with a spiral conveyer flight having a central hollow shaft of a flexible bearing therefor comprising a fixed spherical socket, a ball mounted for rotation therein having two opposed relatively flat faces, cylindrical channels open along one side, one in each flat ball face and at right angles one to the other, stub end shafts mounted in the hollow conveyer shafts having cylindrical members at right angles to the axes of the shafts, located one in each cylindrical pocket, each said pockets being permanently closed at one end, and removable closures for the other ends of the sockets, the removable closure comprising a plug dove tailed in the ball and slidable therein in a plane substantially at right angles to the axis of the channel, and means for holding the block in place.

7. The combination with a spiral conveyer flight having a central hollow shaft of a flexible bearing therefor comprising, a fixed spherical socket, a ball mounted for rotation therein having two opposed relatively flat faces, cylindrical channels open along one side, one in each flat ball face and at right angles one to the other, stud end shafts mounted in the hollow conveyer shafts having cylindrical members at right angles to the axes of the shafts, located one in each cylindrical pocket, each said pockets being permanently closed at one end, and removable closures for the other ends of the sockets, the outside of the contour of the ball except in its flat faces being a substantially true sphere.

8. The combination with a spiral conveyer flight having a central hollow shaft of a flexible bearing therefor comprising a fixed spherical socket, a ball mounted for rotation therein having two opposed relatively flat faces, cylindrical channels open along one side, one in each flat ball face and at right angles one to the other, stub end shafts mounted in the hollow conveyer shafts having cylindrical members at right angles to the axes of the shafts, located one in each cylindrical pocket, each said pockets being permanently closed at one end, and removable closures for the other ends of the sockets, the removable closure comprising a block dove tailed in the ball and slidable therein in a plane substantially at right angles to the axis of the channel, means for holding the block in place, the outside of the contour of the ball except in its flat faces being a substantially true sphere.

Signed at Oak Park, county of Cook and State of Illinois, this 26th day of August, 1926.

FRANK B. CALDWELL.